United States Patent
Omar et al.

(10) Patent No.: US 9,501,980 B2
(45) Date of Patent: Nov. 22, 2016

(54) DISPLAY PANEL AND DISPLAY PANEL SYSTEM

(71) Applicant: STMicroelectronics International N.V., Amsterdam (NL)

(72) Inventors: Nishant Omar, Shipra Sun (IN); Ranajay Mallik, Ghaziabad (IN)

(73) Assignee: STMICROELECTRONICS INTERNATIONAL N.V., Amsterdam (NL)

(*) Notice: Subject to any disclaimer, the term of this patent is extended or adjusted under 35 U.S.C. 154(b) by 129 days.

(21) Appl. No.: 13/708,604

(22) Filed: Dec. 7, 2012

(65) Prior Publication Data

US 2013/0169696 A1   Jul. 4, 2013

(30) Foreign Application Priority Data

Dec. 28, 2011   (IN) .......................... 3847/DEL/2011

(51) Int. Cl.
| | | |
|---|---|---|
| *G09G 5/10* | (2006.01) | |
| *G09G 3/34* | (2006.01) | |
| *G06F 3/14* | (2006.01) | |
| *G09G 3/32* | (2016.01) | |

(52) U.S. Cl.
CPC ........... *G09G 3/3413* (2013.01); *G06F 3/1446* (2013.01); *G09G 3/32* (2013.01)

(58) Field of Classification Search
CPC ..................... G09G 2300/026; G09G 3/3413; G09G 3/32; G06F 3/1446; G06F 3/1423; G06F 3/1438
USPC ..................................................... 345/1.1, 1.3
See application file for complete search history.

(56) References Cited

U.S. PATENT DOCUMENTS

| | | | | |
|---|---|---|---|---|
| 7,015,902 | B2 * | 3/2006 | Nagai ...................... | G09G 3/32 345/204 |
| 2004/0008155 | A1 * | 1/2004 | Cok ........................ | G06F 3/1446 345/1.3 |
| 2005/0253778 | A1 * | 11/2005 | Ku ......................... | G06F 3/1446 345/1.3 |
| 2006/0023002 | A1 * | 2/2006 | Hara et al. .................... | 345/690 |
| 2007/0159416 | A1 * | 7/2007 | Whight ................ | G09G 3/3233 345/76 |
| 2007/0241988 | A1 * | 10/2007 | Zerphy et al. ................. | 345/1.1 |
| 2008/0150879 | A1 * | 6/2008 | Kang .................... | G09G 3/3413 345/102 |
| 2009/0015513 | A1 * | 1/2009 | Kim ...................... | G06F 3/1446 345/1.3 |
| 2009/0015516 | A1 * | 1/2009 | Shoji .................... | G09G 3/2037 345/60 |
| 2009/0058879 | A1 * | 3/2009 | Li ........................ | G09G 3/3607 345/600 |
| 2010/0085382 | A1 * | 4/2010 | Lundqvist ............. | G06F 1/1616 345/659 |

OTHER PUBLICATIONS

Chen, W., "Designing an LED-Based Video-Display Board," Application No. 4208, Maxim, Apr. 10, 2009, 1 page.

* cited by examiner

*Primary Examiner* — Andrew Sasinowski
*Assistant Examiner* — Brent D Castiaux
(74) *Attorney, Agent, or Firm* — Slater Matsil, LLP (57) ABSTRACT

A display panel comprises an array of light elements arranged in n rows by m columns. At least one driver is configured to drive one of said columns and rows, wherein the or each driver is configured to drive each of said columns or said rows. A plurality of the display panels may be used together to form a display panel system.

14 Claims, 4 Drawing Sheets

DISPLAY PANEL AND DISPLAY PANEL SYSTEM

This application claims priority to Indian National Patent Application 3847/DEL/2011, which was filed Dec. 28, 2011, and is incorporated herein by reference.

TECHNICAL FIELD

The present invention relates to a display panel and a display panel system comprising a plurality of display panels.

BACKGROUND

LED (light emitting diode) based image display systems are known. These known systems are provided with a number of different panels which each have an N×N array of LEDs. Each LED may be a RGB (red/green/blue) LED. Typically, each panel has 2×N drivers, with a driver provided for each row and a driver provided for each column. In these known arrangements, red, green and blue data is cascaded through all of the drivers of the panels. This may result in a relatively large transmission time for the data. The data may be cascaded between the panels using a dedicated transmission media.

SUMMARY OF THE INVENTION

In accordance with a preferred embodiment of the present invention, there is provided a display panel comprising an array of light elements arranged in n rows by m columns, and at least one driver configured to drive one of said columns and rows, wherein the at least one driver is configured to drive each of said columns or said rows.

According to another embodiment there is provided a method comprising receiving at a first display panel, data for said first display panel and at least one other panel, the data comprising at least first color data and second color data. The method further comprises outputting separately said first color data and said second color data to another panel, said another panel being the at least one other panel.

According to yet another embodiment there is provided a display panel comprising a plurality of panels. Each panel has an array of light elements, a controller and at least one driver. The at least one driver is configured to output drive data for driving said array. Each panel has different identity information. The display panel further has an input configured to receive input data for each of said panels, said input data for a respective panel having respective identity information.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Before addressing the illustrated embodiments in detail, embodiments and advantageous features of the invention will be generally discussed in the following paragraphs.

In accordance with a preferred embodiment of the present invention, there is provided a display panel comprising an array of light elements arranged in n rows by m columns, and at least one driver configured to drive one of said columns and rows, wherein the at least one driver is configured to drive each of said columns or said rows.

Three drivers may be provided. The drivers may comprise a blue data driver, a green data driver and a red data driver. A microcontroller may be provided, said microcontroller being configured to provide drive data to said at least one driver. The microcontroller may be configured to provide first drive data for said panel and second drive data for at least one other panel to said at least one driver.

The at least one driver may configured to output to a respective driver in another panel said second drive data. At least one driver may comprise a blue driver, a red driver and a green driver, each of said drivers being configured to output respective color data to a corresponding color driver of another panel.

According to another embodiment there is provided a display panel system comprising: a plurality of display panels; each display panel having an array of light elements arranged in n rows by m columns; and at least one driver configured to drive one of said columns and rows, wherein the or each driver is configured to drive each of said columns or said rows.

Each of said display panels may have a microcontroller. Each display panel may have a data receiver configured to receive data for said at least one driver.

The display panels may be arranged in groups, each group having a plurality of display panels, wherein only one panel in each group is provided with a microcontroller, said microcontroller being configured to control all the panels in a group. Each of said panels in a group may be arranged in a row.

Each of said panels may comprise three drivers. The three drivers may comprise a blue data driver, a green data driver and a red data driver. Each driver of at least one panel is coupled to a corresponding driver of another panel.

The microcontroller may be configured to provide first drive data for said panel to said at least one driver and second drive data for at least one other panel to said at least one driver. The at least one driver may comprises a blue driver, a red driver and a green driver, each of said drivers of at least one of said panels being configured to output respective color data to a corresponding color driver of another panel. The light elements may comprise light emitting diodes.

According to an embodiment there is provided a method comprising: receiving at a first display panel, data for said first display panel and at least one other panel, said data comprising at least first color data and second color data; and outputting separately said first color data and said second color data to another panel, said another panel being the or one of said at least one other panel.

According to an embodiment there is provided a display panel comprising: a plurality of panels, each panel having an array of light elements, a controller and at least one driver, said at least one driver configured to output drive data for driving said array, each panel having different identity information; and an input configured to receive input data for each of said panels, said input data for a respective panel having respective identity information.

The panels may be arranged in a chain. Differential data lines may be provided between respective panels configured to provide respective input data to a respective panel.

According to an embodiment there is provided a display panel comprising: a plurality of panels, each panel having an array of light elements and at least two drivers, said at least two drivers configured to output drive data for driving said array, each driver of a panel being associated with a different color; and a controller configured to control said plurality of panels, said controller being configured to provided respective color drive data to respective ones of said drivers of a first panel, said respective color drive data having drive data for said respective color driver of the first panel and for a respective color driver of another of said panels. The respective color drivers of said plurality of panels may be arranged in a daisy chain. The plurality of panels may be arranged in a row.

A brief overview of some embodiments will now be provided. In some embodiments, all of the panels may be the same from a hardware point of view. These panels may be coupled together to provide a large display system. In the Figures, two example topologies are shown:
1. RS485 Network configuration (shown in FIG. 4); and
2. RS485 and SPI Network configuration (shown in FIG. 3).

In the case of a RS485 network configuration all panels are the same and all panels will have microcontroller and RS485 transceiver. A master controller will send display information for each panel over RS485 differential data lines. In this case, no flat ribbon cable may be required.

In case of RS485 and SPI Network configuration, all of the panels are same except that only a first panel of each row has microcontroller and a RS485 transceiver. The rest of the panels of that particular row do not have a microcontroller and a RS485 transceiver mounted on it. In this case the display information is cascaded to other panels from the microcontroller of first panel over flat ribbon cables connecting panels using input and output connectors. The panels in a row may be connected using a daisy chain method using flat ribbon cables.

Figure 1:
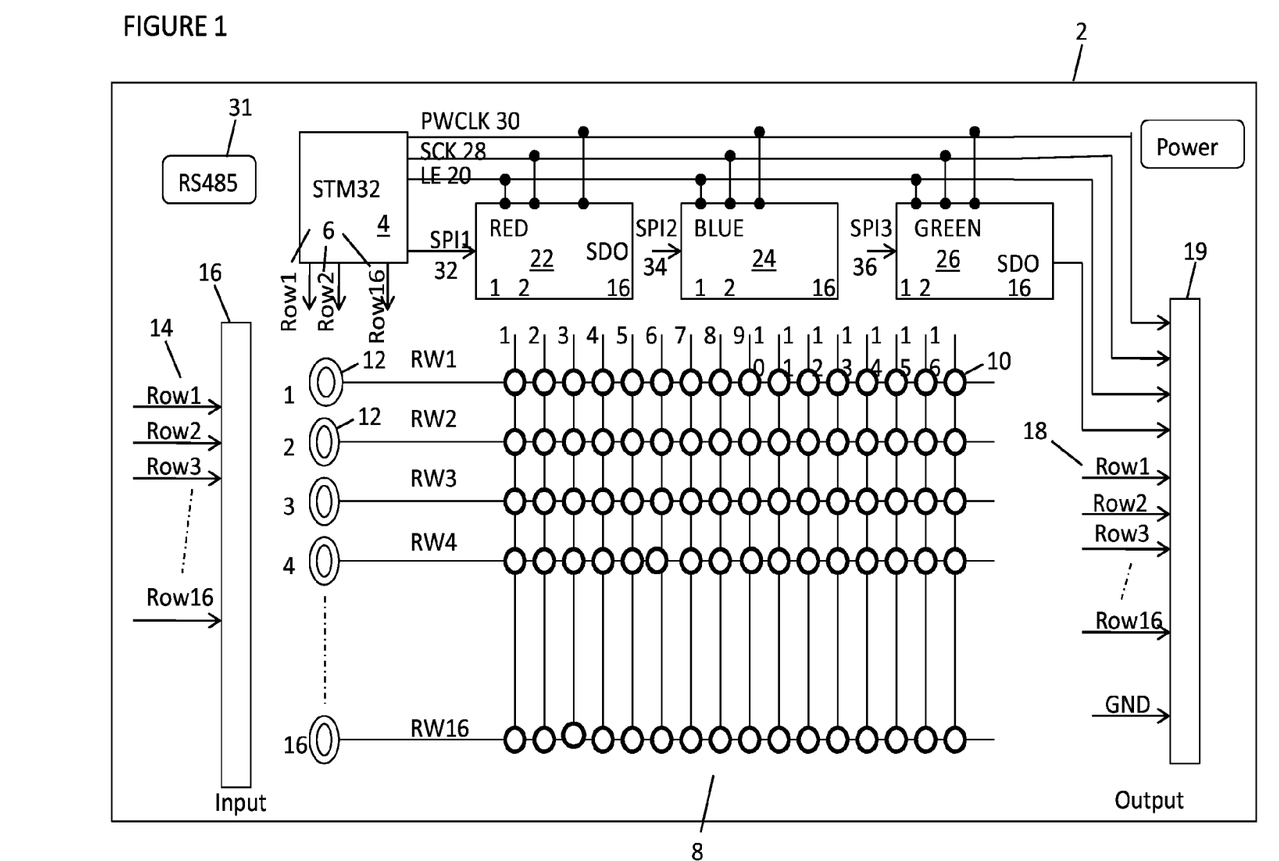
FIG. 1 shows a first display panel.
Figure 2:
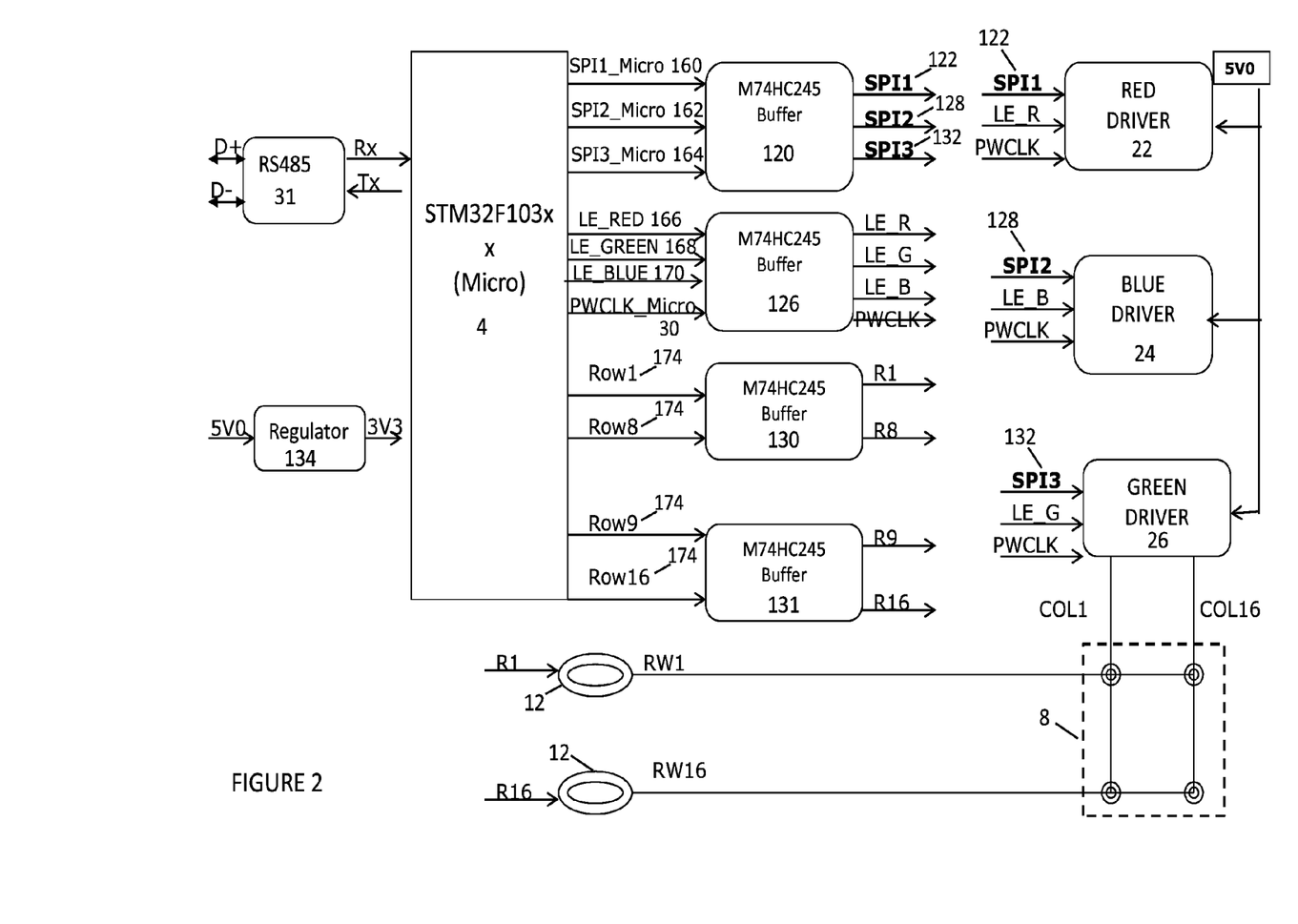
FIG. 2 shows the display panel of FIG. 1 in more detail.
Figure 3:
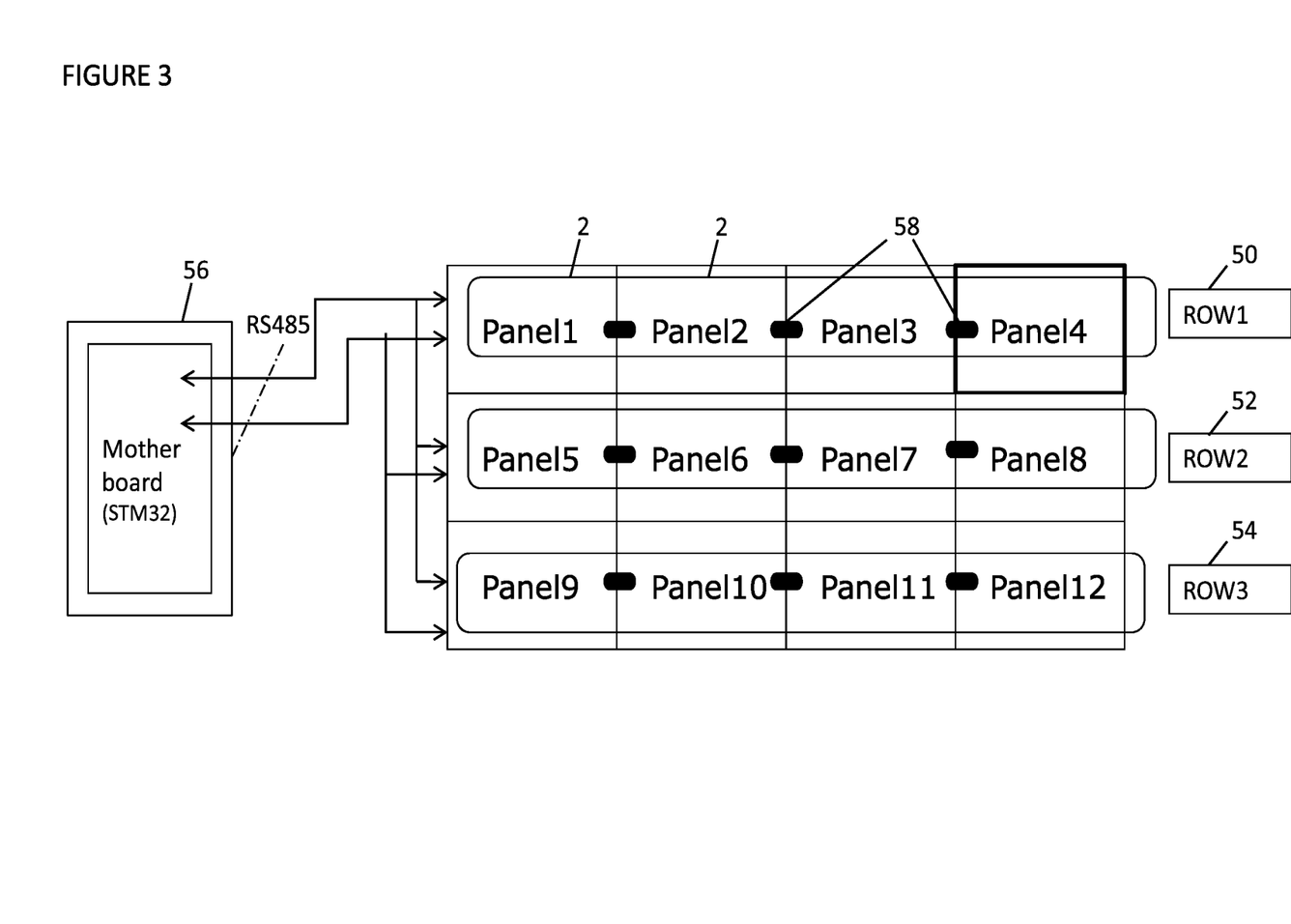
FIG. 3 shows a first display system in which twelve panels provide a display.

Embodiments will now be described in more detail. Reference will now be made to FIGS. 1 and 2 which show an embodiment of a display panel 2. Twelve of these panels are connected as shown in FIG. 3.

In the example shown in FIG. 1, an LED array 8 is provided. In one embodiment, this array may be a 16×16 array. In other words, the LEDs are arranged to be in array having 16 rows and 16 columns. It should be appreciated that the array can have any other suitable size. The number of rows and/or columns may be greater or less than 16. In the example shown in FIG. 1, the number of rows is equal to the number of columns. However, it should be appreciated that in alternative embodiments, the number of rows may not be equal to the number of columns.

Each of the LEDs in the array comprises an RGB LED 10. In other words the LED 10 can be controlled to provide red, blue or green light. It should be appreciated that this is one example of one type of LED which can be used with some embodiments. In alternative embodiments, other colors of LED may be used. For example, each LED may be controlled to provide a single color.

The microcontroller 4 is arranged to provide sixteen row outputs 6. Each output corresponds to a respective row. Each row is controlled by a respective MOSFET 12.

For the embodiments where a microcontroller is not provided on every panel, if the MOSFET is in the first panel of a row, the respective MOSFET will receive the respective row output from the microcontroller 4. If the panel is not the first panel, then the respective MOSFET 12 will receive a gate input 16 from the preceding panel. The input comprises respective row control signals 14 from the respective row outputs of the preceding panel. This is schematically referenced 14 and 16 in FIG. 1. If the panel is not the last panel, then the end of each row is connected to an output 19 providing respective row control signals 18 for the respective rows of the next panel. Thus, row 1 of the array 8 provides an output 18 for row 1 of the next panel and so on.

For embodiments where a microcontroller 4 is provided on each panel, the microcontroller will provide a respective row output for each row.

The respective row output 6 from the microcontroller 4 or the preceding panel is used to control the gate of the respective MOSFET 12. In the example shown, MOSFETs have been used. However, it should be appreciated that in alternative embodiments, alternative types of transistors and/or circuit elements may be used additionally or alternatively.

The microcontroller 4 is arranged to provide a respective latch enable output 20 which is provided to a first red driver 22, a second blue driver 24 and a third green driver 26. A latch enable signal is provided for each different color driver. As can be seen, only three drivers are provided for a respective array in this embodiment. In this embodiment, only one driver for each color is required. In those embodiments where there are fewer than three colors, the number of drivers provided may be the same as the number of colors. In some embodiments each element may provide more than three colors and a driver may be provided for each color.

The microcontroller 4 is also arranged to provide a first clock 28 and a second clock 30. The first clock 28 is a system clock and the second clock 30 is a pulse width modulation timer clock. In practice a separate first clock is provided for each of the red/blue/green drivers. The second clock controls the duty cycle of each of the drivers. It should be appreciated that these control signals—the latch enable, the first clock and the second clock signals—are provided by the microcontroller to its panel. Where the microcontroller is shared by more than one panel, the control signals are propagated to each panel controlled by the microcontroller.

Depending on the nature of the microcontroller, one or more of the control signals may be provided by a general purpose input/output pin of the microcontroller.

Accordingly for the embodiment where a microcontroller is shared between a plurality of panels, the output 19 receives these respective clocks and propagates them to the respective drivers of the next panel along with the latch enable signal.

In some embodiments, the same latch enable signal may be used to control the red, the blue and the green drivers. In alternative embodiments, one latch enable signal may be used for each color driver. In other words a blue latch enable signal is provided to the blue drivers, a green latch enable signal is provided to the green drivers and a red latch enable signal is provided to the red drivers. It should be noted that each panel will have its own red, green and blue drivers.

The microcontroller 4 is arranged to provide a first data output 32 to the red driver, a second data output 34 to the blue driver 24, and a third data output 36 to the green driver 26. The data provided by the microcontroller respectively comprises red data, blue data, and green data.

For those embodiments where the microcontroller is arranged to control a plurality of panels, the red driver is arranged to provide an output which is propagated to the red driver of the next panel. Likewise, the blue driver 24 provides a blue data output which is propagated to the blue driver of the next panel. Finally, the green data is propagated by the green driver 26 to the green driver of the next panel. If the drivers are in the first panel, the drivers will receive the respective red, blue or green data from the microcontroller. If the drivers are not in the first panel, the respective red, green or blue driver will receive the data from the preceding respective driver.

The data which is propagated by the microcontroller 4 is received by the microcontroller from a transceiver 31. A transceiver may be provided in each panel, in those embodiments where a microcontroller is provided in each panel. In those embodiments where a microcontroller is shared by a plurality of panels, a transceiver may be shared by those panels. The transceiver may be an RS485 transceiver. In some embodiments, the microcontroller 4 is an image decoder.

As mentioned previously, the network may be an RS485 network. This is also known as EIA-485 or TIA-EIA-485. This is a standard defining the electrical characteristics of drivers and receivers and is published by the ANSI telecommunications industry association/electronic industries alliance (TIA/EIA). However, any other network protocol or design may be used.

As mentioned previously, in some embodiments, SPI (serial peripheral interface) communication may be used for image data cascading to the LED drivers. This may be used in embodiments where one microcontroller is shared by a plurality of panels. SPI bus is a de facto standard for a synchronous serial data link standard which may operate in a full duplex mode. Devices using this standard communicate in a master/slave manner. The drivers are the slave devices and the microcontroller the master device. SPI also supports the daisy chaining of slave devices together. This facility is used in some embodiments, such as shown in FIG. 3. In other embodiments, any suitable method other than the SPI method may be used for data propagation.

In one embodiment, each driver 22, 24 and 26 has sixteen outputs. Each output is respectively associated with a respective column. For example, output 1 is associated with column 1, output 2 is associated with column 2, and so on. A multiplexed format for driving the LEDs is used having a duty cycle of ⅟16.

In some embodiments each column if it needs to be driven will be driven at a different time to the other columns. In some embodiments, at any one time, three of the columns may be driven at the same time, one by the red driver, one by the blue driver, and one by the green driver. In alternative embodiments, the driver may drive the sixteen columns using fewer than 16 outputs. This may require a multiplexing arrangement. In some embodiments, a driver may drive more than one column at the same time.

In alternative embodiments a longer duty cycle may be used. In this embodiment, the number of cycles taken to cycle through each of the channels will be longer or more than one column can be activated at the same time. By way of example only a duty cycle of ⅛ or ¼ may be used.

In one embodiment, the red driver may be driving column 1, the blue driver may be driving column 6 and the green driver may be driving column 12. In the next cycle, the red driver may be driving column 2, the blue driver may be driving column 7, and the green driver may be driving column 13. Accordingly, the red, blue and green drivers will sequentially drive the columns. In alternative embodiments, hopping patterns may be provided for controlling the order in which the columns are driven. Of course more complicate patterns may be used if a driver is driving more than one column at the same time.

In some embodiments, the LED's in each column may be connected to all three driver outputs at the same time. In some embodiments, each LED is a RGB LED. A RGB LED has a green LED, a blue LED and a red LED. These different color LEDs of the RGB LEDs may be respectively connected to red, green and blue driver outputs. Each column may be considered to be made up of a blue column, a red column and a green column. In other words, the red LEDs of the RGB LED will be connected to the red driver, the blue LEDs of the RGB LED will be connected to the blue driver, and the green LEDs of the RGB LED will be connected to the green driver. In this embodiment, for a given column, the red, blue and green columns may be driven at the same time or one by one. Since three drivers are provide, one driver can be used for red data, the next driver can be used for blue data, and the third driver for green data.

In some embodiments where the microcontroller is shared, the red data is cascaded separately from the blue and green data, and so on; this is able to reduce the cascading time.

The data for a respective column comprises control information for each LED controlling if the respective LED is to be on or off.

Reference is made to FIG. 2 which shows part of the panel of FIG. 1 in more detail. A first buffer 120 is provided. The first buffer is configured to receive, from the microcontroller, first, second and third signals 162, 164 and 166 respectively comprising the red, blue and green data. These signals are output by the first buffer 120. The first buffer 120 outputs the red data 122 to the red driver 22, the blue data 128 to the blue driver 24 and the green data 132 to the green driver 26.

A second buffer 126 is provided which receives from the microcontroller the red latch enable signal 166, the green latch enable signal 168 and the blue latch enable signal 170. The second buffer also receives the second clock 30 (as described in relation to FIG. 1). The second buffer outputs the respective latch enable signals to the respective drivers. The second clock is provided to each of the drivers.

A third buffer 130 is arranged to receive from the microcontroller row data 174 for rows 1 to 8 whilst a fourth buffer is arranged to receive the row data 174 for rows 9 to 16. In some embodiments, the third and fourth buffer may be replaced by one buffer. The outputs of the third and fourth buffers 130 and 131 provide the gate signals which are used to drive the MOSFETs as described in relation to FIG. 1. The buffers are used to avoid a fanout problem and signal degradation problem when a relative large number of panels are cascaded.

The microcontroller 4 is configured to receive and transmit data from the RS 485 transceiver 31. A 5 volt regulator 134 is arranged to provide a voltage to the microcontroller 4. A voltage supply is also provided to the respective drivers. Alternative embodiments may use different voltage supply values.

Reference is made to FIG. 3 which shows a display system which has 12 panels. Each panel is as shown in FIGS. 1 and 2. However it should be appreciated that only the first panel in each row is provided with the microcontroller 4. Accordingly, in the first row 50, only panel 1 is provided with the microcontroller 4. Panels 2, 3 and 4 are not provided with the microcontroller. Likewise, the first panel, panel 5 of the next row 52 is provided with a microcontroller. The other panels of the row, panel 6, 7 and 8 are not provided with microcontrollers. Finally, the third row 54 is again provided with a microcontroller 4 in the first panel, panel 9. No microcontroller is provided in panels 10, 11 or 12. The microcontrollers may be located actually on the panel or in alternative embodiments may be located on a motherboard 56. In the example shown in FIG. 3, the microcontrollers 4 are provided with the panels themselves. The motherboard is configured to direct the required data and optionally control signals to each of the three microcontrollers 4 of the three rows. All of the data and optionally control signals for the first row 50 are directed to the microcontroller of the first panel. Similarly, all of the data and optionally control signals for the second row are directed to the microcontroller 4 of panel 5. Similarly, the data and optionally control signals for the third row are directed to the microcontroller associated with panel 9.

In this arrangement, the panels are arranged in rows. Each row is a cascaded arrangement of the panels, shown in FIGS. 1 and 2. The connection between the panels is via SPI lines. This is the connections between the respective red, blue and green drivers mentioned previously. The connections between the panels may be carried out using a flat ribbon cable.

The first panel of each row as mentioned previously has the microcontroller 4. This microcontroller receives the display data for all of the rows over, for example, the RS485 network from the main motherboard 56. Once the data has been received, the microcontroller of the first panel of each row will cascade the data over the SPI connections to all of the drivers. As mentioned, there are three SPI connections, one for each color. Thus the microcontroller supports three SPI connections.

A connection 58 is provided between respective panels. This connection may carry the serial data for the respective LED drivers as well as the control signals. Depending on the number of panels, a single microcontroller may be enough to control the entire display panel system, in some embodiments.

Figure 4:
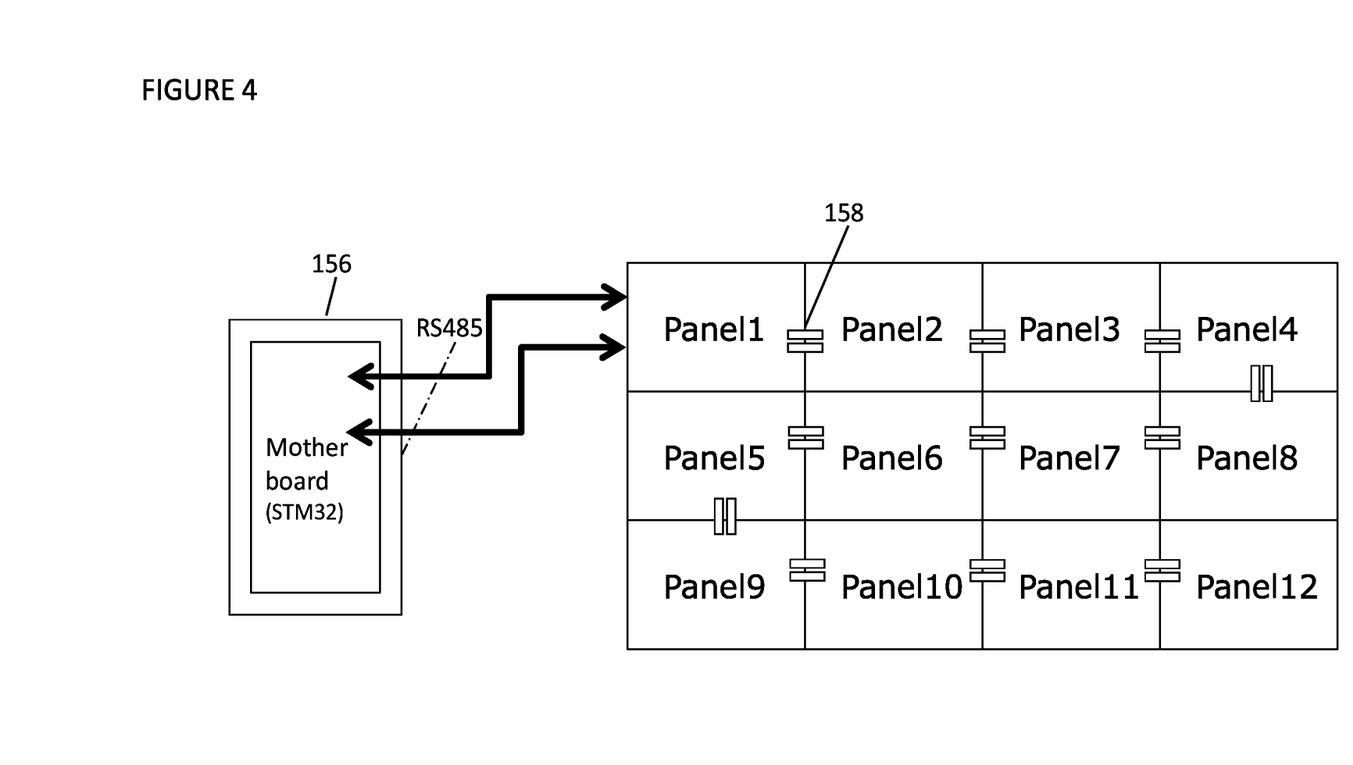
FIG. 4 shows a second display system with twelve panels.

Reference is made to FIG. 4 which shows a display panel system where 12 panels are arranged. The panels are each again as shown in FIGS. 1 and 2. As mentioned previously, each display panel has its own microcontroller. Data for each panel is cascaded individually over the RS485 network from the master control board 156. Thus, all panels will receive respective data for the display from the main control board and then the microcontroller on each panel will control only three drivers mounted on the respective panels for displaying data.

In embodiments, each panel has a dedicated address so that the correct data can be provided to the correct panel. In the example shown, the panels are arranged in a daisy chain with panel 1 connected to 2 to 3 to 4 to 8 to 7 to 6 to 5 to 9 to 10 to 11 to 12. It should be appreciated that this is only one example and any other suitable method for chaining the panels may be used.

The connection 158 provided between each panel is a differential data line. This information which is passed between the panels comprises the red, green and blue data and optionally control signals—the latch enable signal and the first and second clock signals.

In some embodiments, modules or individual panels may be independently developed and can be used to increase the display size without difficulty. In some embodiments, the standardized communication methods of RS485 and SPI are used. However, this is by way of example only and one or other of these standard methods of communication may be substituted by any other suitable different method.

In some embodiments, since the multiplexed format is used for display, the power consumption is averaged. This may be lower than some known arrangements. In some embodiments, the microcontroller used for the image data decoding and data information control may enable the use of standard peripherals, for example those in accordance with the SPI standard. This is used for image control and may rule out the need for any dedicated decoder or communication protocol.

In the example shown, 12 panels are shown. This is only by way of example and the display system may be larger or smaller than the system. It should be appreciated that in alternative embodiments, the various panels may be cascaded or arranged in any suitable manner.

In some embodiments, the rows may be driven by the drivers and the columns may be driven by the output of the microcontroller. The microcontroller may be any suitable controller or microprocessor.

In some embodiments, the duty cycle is 1/n where n is the number of columns. Of course the duty cycle may be 1/(n+x) where x is 1 or more or 1/y where y is less than the number of columns.

Embodiments can be used with other sources of light other than LEDs. In some embodiments where only one panel in a group is provided with a microcontroller, the panels of the group are arranged in a row. In other embodiments, the panels may be arranged in a different configuration.

It is also noted that different combinations of different embodiments are possible. It is also noted herein that while the above describes exemplifying embodiments of the invention, there are several variations and modifications which may be made to the disclosed solution without departing from the spirit and scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A display panel comprising:
    an array of light elements arranged in n rows by m columns;
    a controller configured to provide first drive data and second drive data,
    at least one driver configured to directly drive a first one of said m columns or said n rows, wherein the controller is further configured to provide control signals directly to the at least one driver of the display panel and directly to a panel output, and wherein the controller is further configured to provide the control signals through the panel output to at least one second driver in at least one other panel, wherein the control signals include a system clock, at least one pulse width modulation timer clock, and a latch enable signal and are provided separately from the first drive data and the second drive data, wherein the at least one driver is configured to drive each of the first one of said m columns or said n rows using first drive data and according to the control signals received separately from the first drive data, wherein the at least one driver operates with a duty cycle according to the at least one pulse width modulation timer clock, wherein the at least one driver of the display panel is further configured to provide the second drive data by a serial data out (SDO) connection directly to a panel output, and wherein the at least one driver is further configured to provide the second drive data through the panel output to at the least one second driver in at the least one other panel; and a plurality of MOSFETs, each of the plurality of MOSFETs connected to a respective first end of a second one of the m columns or n rows;

wherein a second end of each of the second one of the m columns or n rows is connected directly to the panel output separately from the SDO connection; and wherein each of the plurality of MOSFETs is configured to control a row control signal and propagate the row control signal through a respective one of the second one of the m columns or n rows of the display panel, and through the panel output to the at least one other panel.

2. The display panel as claimed in claim 1, wherein three drivers are provided.

3. The display panel as claimed in claim 2 wherein said at least one driver comprises a blue data driver, a green data driver and a red data driver.

4. The display panel as claimed in claim 1, wherein said at least one driver comprises a blue driver, a red driver and a green driver, each of said drivers being configured to output respective color data to a corresponding color driver of another panel.

5. A display panel system comprising
a plurality of display panels, each display panel having:
an array of light elements arranged in n rows by m columns; and
at least one driver configured to drive a first one of said m columns and n rows, wherein the at least one driver is configured to drive each of the first one of said m columns or n said rows;
wherein a first display panel of the plurality of display panels has a microcontroller configured to provide first drive data and second drive data to the at least one driver of the first display panel;
wherein the at least one driver of the first display panel is daisy chained with the driver of a second display panel and is configured to provide the second drive data by a serial data out (SDO) connection directly to a panel output and wherein the at least one driver of the first display panel is further configured to provide the second drive data through the panel output to a driver of the second display panel of the plurality of display panels;
wherein the microcontroller of the first display panel is configured to provide control signals to the at least one driver of the first display panel, and to provide the control signals directly to the panel output, wherein the microcontroller is further configured to provide the control signals through the panel output to at least one second driver in at least one other panel, wherein the control signals include a system clock, at least one pulse width modulation timer clock, and a latch enable signal and are provided separately from the first drive data and the second drive data, and wherein the at least one driver operates with a duty cycle according to the at least one pulse width modulation timer clock;
wherein each of the second one of the m columns or n rows is connected directly to the panel output separately from the SDO connection;

wherein at least the first display panel further comprises a plurality of MOSFETs, each of the plurality of MOSFETs connected to a respective first end of a second one of the m columns or n rows of the first display panel; and wherein the microcontroller of the first display panel is connected to each of the plurality of MOSFETs of the first panel and configured to cause the plurality of MOSFETs to control row control signals and propagate the row control signals through the second one of the m columns or n rows of the first display panel and through the panel output, to the second one of the m columns or n rows of the second display panel.

6. The display panel system as claimed in claim 5, wherein each of said display panels has a data receiver configured to receive data for said at least one driver associated with the said respective display panel.

7. The display panel system as claimed in claim 5, wherein said light elements comprise light emitting diodes.

8. A method comprising:
receiving, directly from a controller at a first display panel by at least one first driver of the first display panel, first data for said first display panel and second data for at least a second display panel, said second data comprising at least first color data and second color data;

receiving, from the controller by the at least one first driver, driver control signals separate from the first data, wherein the driver control signals include a system clock, at least one pulse width modulation timer clock, and a latch enable signal, wherein the at least one;

driving a first one of rows or columns of an array of light elements of the first display panel, directly, by the at least one first driver according to the first data and the driver control signals, wherein the at least one first driver operates with a duty cycle according to the at least one pulse width modulation timer clock;

acquiring row control signals at first ends of a second one of the rows or columns of the array of light elements, and propagating the row control signals through the second one of the rows or columns and directly from the second one of the rows or columns to a panel output, and further propagating the row control signals to corresponding rows or columns of the second display panel through the panel output;

outputting separately, by the at least one first driver, said first color data and said second color data directly by a serial data out (SDO) connection to the panel output separately from the row control signals, and further propagating the first color data and the second color data through the panel output to at least one second driver of the second display panel, wherein the at least one second driver is daisy chained to the first driver; and outputting the driver control signals by the controller directly to the panel output, and providing the control signals through the panel output to the at least one second driver of the second display panel.

9. A display panel system comprising:
a plurality of panels, each panel having
an array of light elements,
a controller configured to provide first drive data and second drive data,
a plurality of MOSFETs, each of the plurality of MOSFETs connected to a respective first end of a row of the array of light elements and configured to control a respective row control signal according to a respective row output signal of first row output signals received from one of the controller and a preceding panel; and at least one driver, said at least one driver configured to output drive data for driving said array, each panel having different identity information;

wherein the controller of at least one first panel of the plurality of panels is further configured to provide control signals directly to the at least one driver of the at least one first panel and directly to a panel output of the at least one first panel, and wherein the controller is further configured to provide the control signals through the panel output to at least one second driver in at least one other panel of the plurality of panels, wherein the control signals include a system clock, at least one pulse width modulation timer clock, and a latch enable signal and are provided separately from the first drive data and the second drive data, wherein each of the row control signals controls a row of the array of light elements, and is output by the array of light elements as a second row output signal;

wherein the latch enable signal, the system clock, the at least one pulse width modulation timer clock, the second row output signals, and at least a portion of color data are passed between the panels as separate signals on separate connections; and wherein the at least one driver of each of the plurality of panels operates drives columns of the array of the respective one of the plurality of panels according to at least a portion of the color data, the latch enable signal and the system clock with a duty cycle according to the at least one pulse width modulation timer clock.

10. The display panel system as claimed in claim 9, wherein said panels are arranged in a chain.

11. The display panel system as claimed in claim 9, comprising differential data lines between respective panels, configured to provide respective input data to a respective panel.

12. A display panel system comprising:

a plurality of panels, each panel having an array of light elements and at least two drivers, said at least two drivers configured to output drive data for driving said array of the respective panel, each of the at least two drivers of the panel being a color driver associated with a different color; and a controller configured to control said plurality of panels, said controller being configured to provide respective color drive data to respective ones of said drivers of a first panel, said respective color drive data having first drive data for said respective color driver of the first panel and second drive data for a respective color driver of a second panel of said panels, and the controller being further configured to control row control signals controlling rows of the array of light elements of the first panel, the row control signals propagated by the array of light elements of the first panel directly to a panel output of the first panel, and the row control signals further propagated by the array of light elements through the panel output to the array of light elements of another panel of the plurality of panels;

wherein the respective color driver of the first panel is configured to provide the second drive data to the respective color driver of the second panel on a serial data out (SDO) connection through the panel output;

wherein the controller is further configured to provide driver control signals directly to the at least two drivers of the first panel and directly to the panel output and through the panel output to the at least two drivers of the second panel, wherein the driver control signals include a system clock, at least one pulse width modulation timer clock, and a latch enable signal, wherein the at least two drivers of the first panel drive columns of the array of light elements of the first panel according to the first drive data, and the driver control signals and with a duty cycle according to the at least one pulse width modulation timer clock, and wherein the at least two drivers of the second panel operate according the driver control signals and with a duty cycle according to the at least one pulse width modulation timer clock; and wherein the driver control signals, the second drive data, and the row control signals are provided separately from each other on separate connections through the panel output.

13. The display panel system as claimed in claim 12, wherein said respective color drivers of said plurality of panels are arranged in a daisy chain.

14. The display panel system as claimed in claim 13, wherein said plurality of panels are arranged in a row.

* * * * *